US009656555B2

United States Patent
Matsumoto et al.

(10) Patent No.: US 9,656,555 B2
(45) Date of Patent: May 23, 2017

(54) ELECTRIC MOTOR VEHICLE MAIN CIRCUIT SYSTEM

(75) Inventors: Takeo Matsumoto, Chiyoda-ku (JP); Yoshio Nagatsuka, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 504 days.

(21) Appl. No.: 14/373,997

(22) PCT Filed: Jan. 30, 2012

(86) PCT No.: PCT/JP2012/052046
§ 371 (c)(1),
(2), (4) Date: Jul. 23, 2014

(87) PCT Pub. No.: WO2013/114549
PCT Pub. Date: Aug. 8, 2013

(65) Prior Publication Data
US 2015/0001021 A1    Jan. 1, 2015

(51) Int. Cl.
*H02P 1/00*      (2006.01)
*B60L 9/18*      (2006.01)
(Continued)

(52) U.S. Cl.
CPC ...... *B60L 9/18* (2013.01); *B60L 1/00* (2013.01); *B60L 7/06* (2013.01); *B60L 7/22* (2013.01);
(Continued)

(58) Field of Classification Search
CPC .. Y10T 307/625; Y10T 308/615; H02J 9/062; H02J 9/00; C03B 23/245
See application file for complete search history.

(56) References Cited

U.S. PATENT DOCUMENTS

| 4,865,123 A | 9/1989 | Kawashima et al. |
| 5,521,788 A | 5/1996 | Miyazaki |

(Continued)

FOREIGN PATENT DOCUMENTS

| AU | 2002325688 B2 | 8/2007 |
| EP | 0 421 743 A2 | 4/1991 |

(Continued)

OTHER PUBLICATIONS

International Search Report (PCT/ISA/210) mailed on Mar. 13, 2012, by the Japanese Patent Office as the International Searching Authority for International Application No. PCT/JP2012/052046.
(Continued)

*Primary Examiner* — Shawki S Ismail
*Assistant Examiner* — Zoheb Imtiaz
(74) *Attorney, Agent, or Firm* — Buchanan Ingersoll & Rooney PC

(57) ABSTRACT

An electric motor vehicle main circuit system includes an AC-DC switching circuit switching a supply destination of electric power according to a type of supplied power from an overhead wire, a transformer, a tap changer switching tap positions of the transformer, a CNV converting an output of the tap changer into a direct-current voltage, an AC contactor opening and closing a power supply path between the tap changer and the CNV, an FC accumulating an output of the CNV or the overhead wire, a CH stepping up an output of the FC, an FC accumulating an output of the CH, an INV converting an output of the FC into a desired alternating-current voltage, a DC contactor opening and closing a power supply path between the AC-DC switching circuit and the CH, and a control section controlling the tap changer, the AC contactor, the DC contactor, the CNV, and the CH.

10 Claims, 13 Drawing Sheets

(51) Int. Cl.
  *B60L 9/30* (2006.01)
  *B60L 1/00* (2006.01)
  *B60L 7/06* (2006.01)
  *B60L 7/22* (2006.01)
  *B60W 10/00* (2006.01)

(52) U.S. Cl.
  CPC ............ *B60L 9/30* (2013.01); *B60W 10/00* (2013.01); *B60L 2200/26* (2013.01); *B60L 2210/30* (2013.01); *B60L 2210/40* (2013.01); *Y02T 10/7241* (2013.01)

(56) References Cited

U.S. PATENT DOCUMENTS

| | | | | |
|---|---|---|---|---|
| 2004/0071004 | A1* | 4/2004 | King ............... | H02J 7/0054 363/142 |
| 2006/0103359 | A1* | 5/2006 | Watanabe ......... | H02M 3/1582 323/225 |
| 2006/0139823 | A1* | 6/2006 | Shoji ............... | H02M 1/34 361/56 |
| 2009/0200970 | A1* | 8/2009 | Kimura ............. | H02P 27/08 318/400.3 |
| 2010/0188066 | A1* | 7/2010 | Rodenhiser ........ | H02J 9/062 323/302 |
| 2014/0070736 | A1* | 3/2014 | Gorka .............. | B60L 11/005 318/139 |

FOREIGN PATENT DOCUMENTS

| | | |
|---|---|---|
| EP | 1 288 060 A1 | 3/2003 |
| JP | 61-57706 B2 | 12/1986 |
| JP | 5-199601 A | 8/1993 |
| JP | 5-326774 A | 12/1993 |
| JP | 6-141404 A | 5/1994 |
| JP | 6-82941 B2 | 10/1994 |
| JP | 2513040 B2 | 7/1996 |
| JP | 9-168203 A | 6/1997 |
| JP | 10-303587 A | 11/1998 |
| JP | 11-069505 A | 3/1999 |
| JP | 11-113102 A | 4/1999 |
| JP | 3070787 b2 | 7/2000 |
| JP | 2000-350301 A | 12/2000 |
| JP | 2004-187368 A | 7/2004 |
| JP | 2005-080386 A | 3/2005 |
| JP | 2006-066669 A | 3/2006 |
| JP | 2007-062694 A | 3/2007 |
| JP | 2009-188034 A | 8/2009 |
| JP | 2011-130579 A | 6/2011 |
| JP | 2011-139039 A | 7/2011 |
| ZA | 2004/6835 A | 6/2005 |

OTHER PUBLICATIONS

Written Opinion (PCT/ISA/237) mailed on Mar. 13, 2012, by the Japanese Patent Office as the International Searching Authority for International Application No. PCT/JP2012/052046.

Japanese Office Action issued on Oct. 25, 2012, with English translation, pp. 1-6.

"Distribution Box for Use with Water Cooled Systems," IP.Com Journal, IP.Com Inc., West Henrietta, NY, US, (Nov. 29, 2007), pp. 1-2, (3 pages).

Fuchs et al., "Advanced Multi-System Locomotives Using 6.5 kV-power Semiconductors," 8th European Conference on Power Electronics and Applications. Lausanne, CH, (Sep. 7-9, 1999); [EPE. European Conference on Power Electronics and Applications], EPE Association, Brussels, BE, vol. Conf. 8, pp. 1-6.

Jeunesse et al., "La BB36000: La Locomotive Multitension Europeenne," REE: Revue Generale De L'Electricte et de L'Electronique, Revue Generale De L'Electricite S.A, FR, (Oct. 1, 1998), No. 9, pp. 27-35.

Weschta, "Antriebstechnik Für DieNeuen Hochleistungslokomotiven der Baureihe S252 der Spanischen Eisenbahnen," Zietschrift Fur Eisenbahnwesen Und Verkehrstechnik. Die Eisenbahntechnik + Glasers Annalen, Georg Siemens Verlagsbuchhandlung, Berlin, DE, (Nov. 1, 1990), vol. 114, No. 11/12, pp. 492-494, 496. (10 pages).

The extended European Search Report issued on Nov. 20, 2015, by the European Patent Office in corresponding European Patent Application No. 12867430.6-1810. (12 pages).

Office Action issued on Oct. 20, 2015, by the Chinese Patent Office in corresponding Chinese Patent Application No. 201280068444.8, and an English Translation of the Office Action. (15 pages).

* cited by examiner

FIG.7

| | POWER SUPPLY 1<br>AC 15 kV 16.7 Hz | POWER SUPPLY 2<br>AC 25 kV 50 Hz | POWER SUPPLY 3<br>DC 1.5 kV | POWER SUPPLY 4<br>DC 3 kV | AC CONTACTOR | DC CONTACTOR | TAP CHANGER (TAP POSITIONS) | CNV OPERATION COMMAND CGSC | CH OPERATION COMMAND CHSC | REMARKS |
|---|---|---|---|---|---|---|---|---|---|---|
| CASE 1 | ● | ● | ● | ● | SWITCHED | SWITCHED | A, B SWITCHED (※1) | (※2) ON/ ALWAYS OFF | (※3) ON/ ALWAYS OFF | ADAPTED TO TWO ALTERNATING-CURRENT POWER SUPPLIES, TWO DIRECT-CURRENT POWER SUPPLIES |
| CASE 2 | ● | ● | ● | | SWITCHED | SWITCHED | A, B SWITCHED | ON/ ALWAYS OFF | ALWAYS OFF | ADAPTED TO TWO ALTERNATING-CURRENT POWER SUPPLIES, ONE DIRECT-CURRENT POWER SUPPLY |
| CASE 3 | ● | ● | | ● | SWITCHED | SWITCHED | A, B SWITCHED | ON/ ALWAYS OFF | ALWAYS OFF | ADAPTED TO TWO ALTERNATING-CURRENT POWER SUPPLIES, ONE DIRECT-CURRENT POWER SUPPLY |
| CASE 4 | ● | | ● | ● | SWITCHED | SWITCHED | A | ON/ ALWAYS OFF | ALWAYS OFF | ADAPTED G TO ONE ALTERNATING-CURRENT POWER SUPPLY, TWO DIRECT-CURRENT POWER SUPPLIES |
| CASE 5 | | ● | ● | ● | SWITCHED | SWITCHED | B | ON/ ALWAYS OFF | ALWAYS OFF | |
| CASE 6 | ● | ● | | | ON | OFF | A, B SWITCHED | ON | ALWAYS OFF | ADAPTED TO TWO ALTERNATING-CURRENT POWER SUPPLIES |
| CASE 7 | ● | | ● | | SWITCHED | SWITCHED | A | ON/ ALWAYS OFF | ALWAYS OFF | ADAPTED TO ONE ALTERNATING-CURRENT POWER SUPPLY, ONE DIRECT-CURRENT POWER SUPPLY |
| CASE 8 | ● | | | ● | SWITCHED | SWITCHED | A | ON/ ALWAYS OFF | ALWAYS OFF | ADAPTED TO ONE ALTERNATING-CURRENT POWER SUPPLY, ONE DIRECT-CURRENT POWER SUPPLY |
| CASE 9 | | ● | ● | | SWITCHED | SWITCHED | B | ON/ ALWAYS OFF | ALWAYS OFF | |
| CASE 10 | | ● | | ● | SWITCHED | SWITCHED | B | ON/ ALWAYS OFF | ALWAYS OFF | |
| CASE 11 | | | ● | ● | OFF | ON | ARBITRARY | ALWAYS OFF | ON/ ALWAYS OFF | ADAPTED TO TWO DIRECT-CURRENT POWER SUPPLIES |
| CASE 12 | ● | | | | ON | OFF | A | ON | ALWAYS OFF | ADAPTED TO ONE ALTERNATING-CURRENT POWER SUPPLY |
| CASE 13 | | ● | | | ON | OFF | B | ON | ALWAYS OFF | |
| CASE 14 | | | ● | | OFF | ON | ARBITRARY | ALWAYS OFF | ON | ADAPTED TO ONE DIRECT-CURRENT POWER SUPPLY |
| CASE 15 | | | | ● | OFF | ON | ARBITRARY | ALWAYS OFF | ALWAYS OFF | |

※1: A POSITION→IN CASE OF POWER SUPPLY 1, B POSITION→IN CASE OF POWER SUPPLY 2
※2: ON→IN CASE OF ALTERNATING-CURRENT POWER SUPPLIES (POWER SUPPLIES 1, 2),
ALWAYS OFF→IN CASE OF DIRECT-CURRENT POWER SUPPLIES (POWER SUPPLIES 3, 4)
※3: ON→CHOPPER OPERATION (IN CASE OF POWER SUPPLY 3),
ALWAYS OFF→THROUGH-OPERATION (IN CASE OF POWER SUPPLIES OTHER THAN POWER SUPPLY 3)

ELECTRIC MOTOR VEHICLE MAIN CIRCUIT SYSTEM

FIELD

The present invention relates to an electric motor vehicle main circuit system.

BACKGROUND

In recent years, in overseas countries (in particular, the European market), there is a need for an electric motor vehicle adaptable to various overhead wire voltages (e.g., AC15 kV-16.7 Hz, AC25 kV-50 Hz, DC1.5 kV, and DC3.0 kV) according to the unification of railroad networks in Europe and an increase in environment consciousness. It is desired to equip an electric motor vehicle main circuit system adaptable to such a multiple power supply.

On the other hand, the applicant performed document searches for technologies concerning an electric motor vehicle main circuit system adaptable to a plurality of multiple power supplies by an alternating current and a direct current like the multiple power supply explained above, more specifically, both of an alternating-current power supply and a direct-current supply and adaptable to an AC-DC multiple power supply in which at least one of the alternating-current power supply and the direct-current power supply is provided in a plural form. However, the inventor has not found an appropriate document including the related art. The "plural" in this context means that both of the direct-current power supply and the alternating-current power supply are distinguished according to a difference in an overhead wire voltage.

Note that, if reference documents are presented concerning the technology explained above, there are Patent Literatures 1 and 2. Patent Literature 1 discloses a technology for unitizing devices in a control device to attain a reduction in a work time and a restoration time from a failure. Patent Literature 2 discloses a technology for securing compatibility among units in a control device to solve a problem of an inductive interference when the units are manufactured by a plurality of manufactures.

CITATION LIST

Patent Literature

Patent Literature 1: Japanese Patent Application Laid-Open No. H5-199601
Patent Literature 2: Japanese Patent Application Laid-Open No. 2004-187368

SUMMARY

Technical Problem

Conventionally, in general, a combination of a plurality of various power supplies is designed every time the power supplies are combined. Therefore, in electric motor vehicle main circuit systems built by respective designs, common use of components cannot be attained. Components necessary for maintenance are present by the number of combinations of power supplies. This is extremely inefficient in maintainability.

The present invention has been devised in view of the above and it is an object of the present invention to provide an electric motor vehicle main circuit system that can attain common use of components and is excellent in maintainability.

Solution to Problem

In order to solve above-mentioned problems and achieve the object, the present invention provides an electric motor vehicle main circuit system configured to be capable of being housed in a vehicle control device that forms a part of an electric motor vehicle driving system, an AC-DC switching circuit that switches a supply destination of electric power according to a type of supplied power from an overhead wire and a transformer that includes two tap positions on a secondary winding wire side, steps down an input alternating-current voltage, and outputs a desired alternating-current voltage from the two tap positions being provided in the electric motor vehicle driving system, and alternating-current by a first alternating-current power supply, alternating-current power by a second alternating-current power supply having an higher output voltage than the first alternating-current power supply, direct-current power by a first direct-current power supply, and direct-current power by a second direct-current power supply having a higher output voltage than the first direct-current power supply being assumed as the type of the supplied power, the electric motor vehicle main circuit system comprising: a tap changer that switches the tap positions of the transformer; a converter that converts an alternating-current voltage output by the tap changer into a desired direct-current voltage; an alternating-current contactor that opens and closes a power supply path between the tap changer and the converter; a first filter capacitor that accumulates direct-current power output by the converter or direct-current power supplied from the overhead wire; a chopper circuit that steps up a direct-current voltage output by the first filter capacitor to a desired direct-current voltage; a second filter capacitor that accumulates direct-current power output by the chopper circuit; an inverter that converts a direct-current voltage output by the second filter capacitor into a desired alternating-current voltage; a direct-current contactor that opens and closes supply of direct-current power from the AC-DC switching circuit; and a control section that controls the tap changer, the alternating-current contactor, the direct-current contactor, the converter, and the chopper circuit on the basis of information concerning a voltage of the overhead wire and command information from an outside, the tap changer, the converter, the alternating-current contactor, the first filter capacitor, the chopper circuit, the second filter capacitor, the inverter, the direct-current contactor, and the control section being configured to be capable of being housed in the vehicle control device, wherein when the first direct-current power supply is not used among the first and second alternating-current power supplies and the first and second direct-current power supplies, the electric motor vehicle main circuit system is configured by removing the chopper circuit.

Advantageous Effects of Invention

According to the present invention, there is an effect that the electric motor vehicle main circuit system can operate receiving power supply from an AC-DC multiple power supply in which at least one of an alternating-current power supply and a direct-current power supply is provided in a plurality of types.

BRIEF DESCRIPTION OF DRAWINGS

FIG. 7 is a diagram of a list in a table format of operation modes corresponding to the first to fourth power supplies.

DESCRIPTION OF EMBODIMENTS

Electric motor vehicle main circuit systems according to embodiments of the present invention are explained below with reference to the accompanying drawings. Note that the present invention is not limited by the embodiments explained below.

First Embodiment

Figure 1:
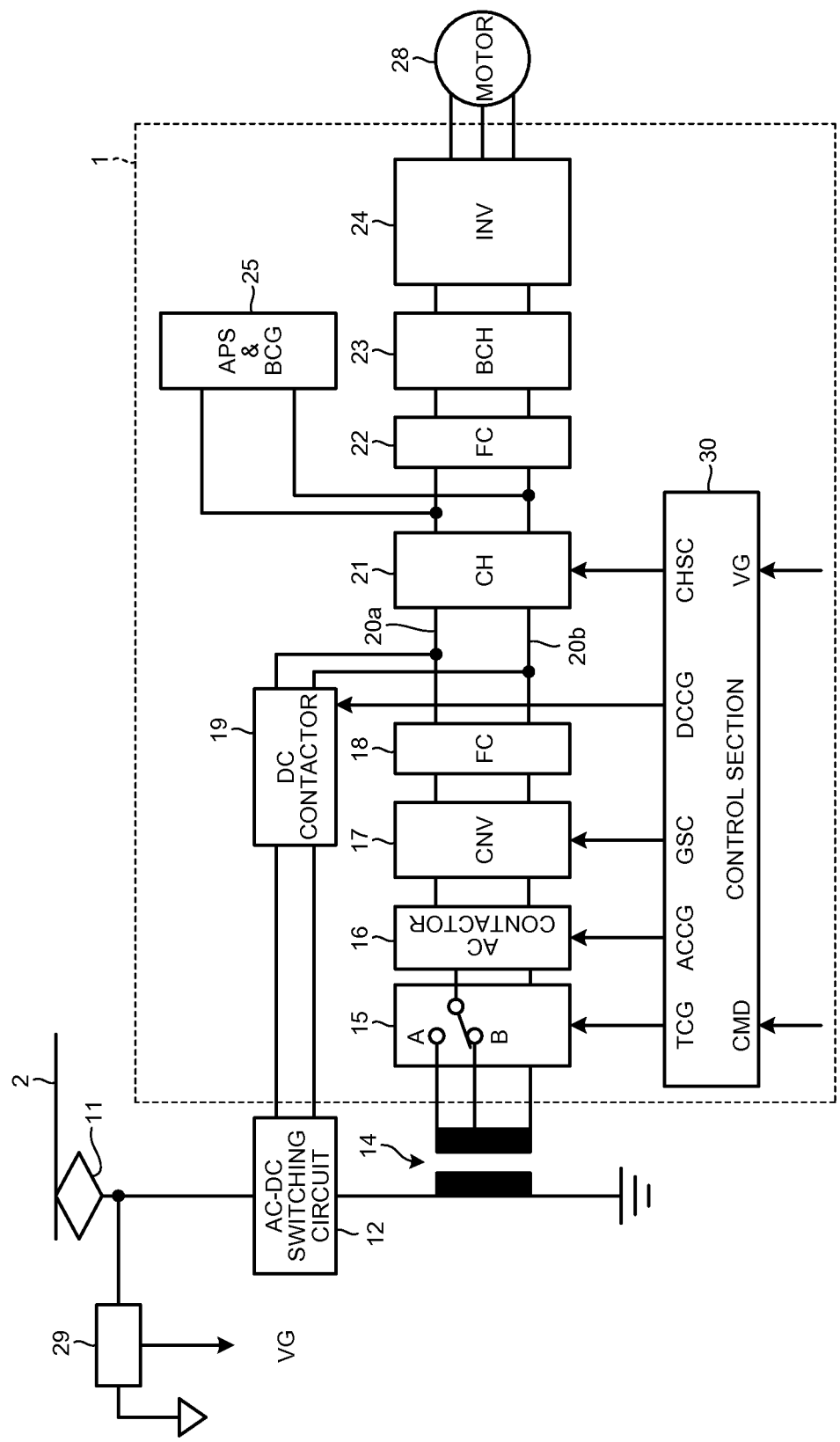
FIG. 1 is a diagram of a configuration example of an electric motor vehicle driving system including an electric motor vehicle main circuit system according to a first embodiment.

FIG. 1 is a diagram of a configuration example of an electric motor vehicle driving system including an electric motor vehicle main circuit system according to a first embodiment of the present invention. As shown in the figure, the electric motor vehicle driving system according to the first embodiment includes an electric motor vehicle main circuit system 1 and a current collector 11, an AC-DC switching circuit 12, a transformer 14, and an electric motor (a motor) 28 for electric motor driving arranged around the electric motor vehicle main circuit system 1.

The electric motor vehicle main circuit system 1 includes the transformer 14, a tap changer 15, an AC (alternating-current) contactor 16, a converter (hereinafter referred to as "CNV") 17, an FC 18 functioning as a first filter capacitor (hereinafter referred to as "FC"), a DC (direct-current) contactor 19, a boost chopper (hereinafter referred to as "CH") 21, an FC 22 functioning as a second FC, a brake chopper (hereinafter referred to as "BCH") 23, an inverter (hereinafter referred to as "INV") 24, an APS & BCG 25 mounted with an auxiliary power supply (hereinafter referred to as "APS") and a battery charger (hereinafter referred to as "BCG"), and a control section 30 that controls these devices or circuit sections.

A voltage detector 29 that detects the voltage of an overhead wire 2 is connected between the current collector 11 and the AD-DC switching circuit 12. The motor 28 is connected to the INV 24 arranged at an output end of the electric motor vehicle main circuit system 1. Note that, as the motor 28, an induction motor or a synchronous motor is suitable.

The AC-DC switching circuit 12 switches a supply destination of electric power according to a type of supplied power (a supply power source) from the overhead wire 2. More specifically, when alternating-current power (e.g., AC15 kV-16.7 Hz or AC25 kV-50 Hz) is supplied from the overhead wire 2, the AC-DC switching circuit 12 switches an output destination to the transformer 14. When direct-current power (e.g., DC1.5 kV or DC3.0 kV) is supplied from the overhead wire 2, the AC-DC switching circuit 12 switches the output destination to the DC contactor 19. Note that the switching of the power supply destination in the AC-DC switching circuit 12 is automatically performed.

The transformer 14 includes a primary winding wire and a secondary winding wire and includes two contacts A and B as tap positions in the secondary winding wire. The transformer 14 steps down an input voltage and outputs a desired voltage from the two tap positions. The tap changer 15 switches the two tap positions on the basis of a control signal output from a control section explained below and according to a type of a supply power source. Note that a relation between the tap positions and the type of the supply power source is explained below.

The AC contactor 16 is arranged between the tap changer 15 and the CNV 17. The AC contactor 16 opens and closes a power supply path between these components. The CNV 17 is provided on the output side of the AC contactor 16. The FC 18 is provided on the output side of the CNV 17. The CNV 17 is a power converting section that converts alternating-current power (an alternating-current voltage) into desired direct-current power (a desired direct-current voltage). The direct-current power converted by the CNV 17 is accumulated in the FC 18 as charges.

The DC contactor 19 is connected between a positive side direct-current bus 20a and a negative side direct-current bus 20b that electrically connect the FC 18 (or the CNV 17) and the CH 21 (or the INV 24). According to the connection, the DC contactor 19 opens and closes a power supply path between the AC-DC switching circuit 12 and the CH 21. According to the connection, when the DC contactor 19 closes the path, direct-current power (a direct-current voltage) output by the AC-DC switching circuit 12 is supplied (applied) to the CH 21.

The CH 21 is a circuit for stepping up the direct-current voltage applied via the DC contactor 19, that is, a DC/DC converter having a boosting function. Note that, when the CH 21 operates as a booster circuit, a not-shown switching element included in the CH 21 operates. On the other hand, when the CH 21 is not caused to function, the CH 21 operates as a mere through-circuit (a circuit that transmits electric power without affecting other circuit operations). Note that a relation between the operation of the CH 21 and the type of the supply power source is explained below.

An output of the CH 21 is accumulated in the FC 22 as direct-current power. The BCH 23 is provided on the output side of the FC 22. The INV 24 is provided on the output side of the BCH 23. The INV 24 is a power converting section that converts direct-current power (a direct-current voltage) into alternating-current power (an alternating-current voltage) having a desired voltage and a desired frequency. The electric power converted by the INV 24 is supplied to the motor 28. The motor 28 rotates to give a driving force to the electric motor vehicle. The BCH 23 is a circuit that consumes excess power that cannot be regenerated to the overhead wire 2 side when the motor 28 operates as a generator.

The APS & BCG 25 is a component including a power supply (battery) device that supplies electric power to devices (e.g., a brake device, a lighting device, a door opening and closing device, and an air conditioning device; hereinafter referred to as "auxiliary machines") other than the motor 28, which is a main electric motor, and a charging device for charging the power supply device. In FIG. 1, the APS & BCG 25 is configured to operate using output power of the CH 21.

The control section 30 monitors a detected voltage of the voltage detector 29 as overhead wire voltage information VG to determine the type of the supply power source. Command information such as an operation command or a control command by a commander is input to the control section 30 as a motorman's cab command CMD. The control section 30 generates, on the basis of the overhead wire voltage information VG and the motorman's cab command CMD, a tap changer switching command TCG for switching the tap positions of the tap changer 15, an AC contactor opening and closing command ACCG for controlling opening and closing of the AC contactor 16, a DC contactor opening and closing command DCCG for controlling opening and closing of the DC contactor 19, a CNV operation command GSC for the CNV 17, and a CH operation command CHSC for the CH 21 and controls the respective sections.

The operation of the electric motor vehicle main circuit system according to the first embodiment is explained. Note that, as a type of supplied power, four power supplies listed blow, which are standard in Europe, are explained as examples.

Figure 2:
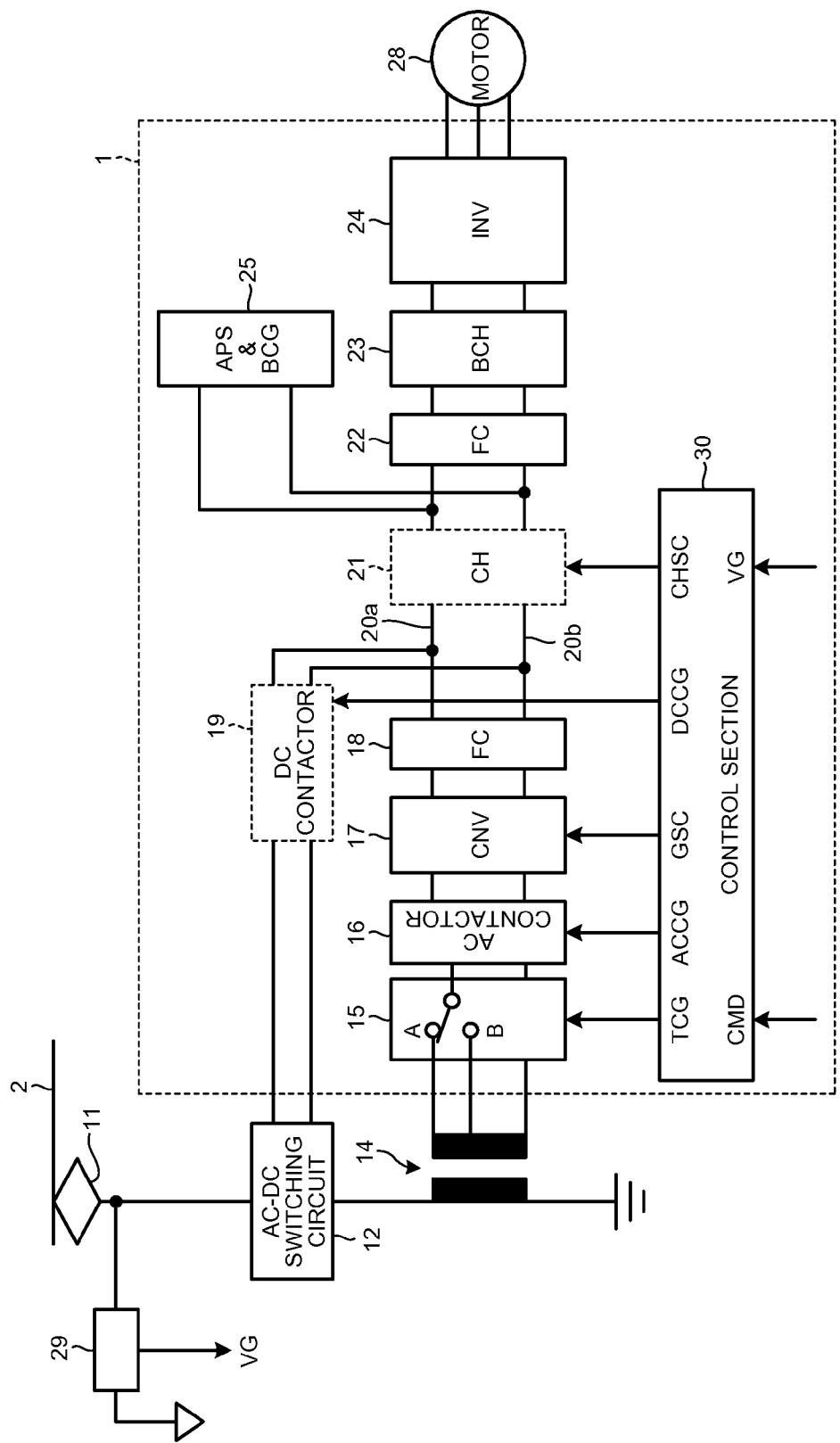
FIG. 2 is a diagram for explaining an operation performed when a first power supply (AC15 kV-16.7 Hz) is used as a supply power source.

(1) First power supply: AC15 kV-16.7 Hz
(2) Second power supply: AC25 kV-50 Hz
(3) Third power supply: DC1.5 kV
(4) Fourth power supply: DC3.0 kV First, an operation performed when the first power supply is used as the supply power source is explained. FIG. 2 is a diagram for explaining the operation performed when the first power supply (AC15 kV-16.7 Hz) is used as the supply power source. Specifically, in the figure, parts (units) that operate receiving the supply of the first power supply are shown on the configuration diagram of FIG. 1. In FIG. 2, parts indicated by solid lines are parts related to the operation. Parts indicated by broken lines are parts not caused to operate.

The first power supply is an alternating-current power supply. Therefore, alternating-current power from the first power supply is supplied to the transformer 14. The tap positions of the tap changer 15 are switched to the A side. The alternating-current power is supplied to the CNV 17 through the AC contactor 16 controlled to ON. Of the DC contactor 19 and the CH 21 indicated by the broken lines, the DC contactor 19 is controlled to OFF. A chopper operation of the CH 21 is stopped. Because the CH 21 stops the chopper operation, the CH 21 performs a through-operation. An output of the CNV 17 is accumulated in the FCs 18 and 22. An output voltage of the CNV 17 is applied to the INV 24. The INV 24 supplies required electric power to the motor 28 using accumulated charges of the FCs 18 and 22 and drives the motor 28. The APS & BCG 25 supplies required electric power to the auxiliary machines using the accumulated charges of the FCs 18 and 22 and causes the auxiliary machines to operate.

Figure 3:
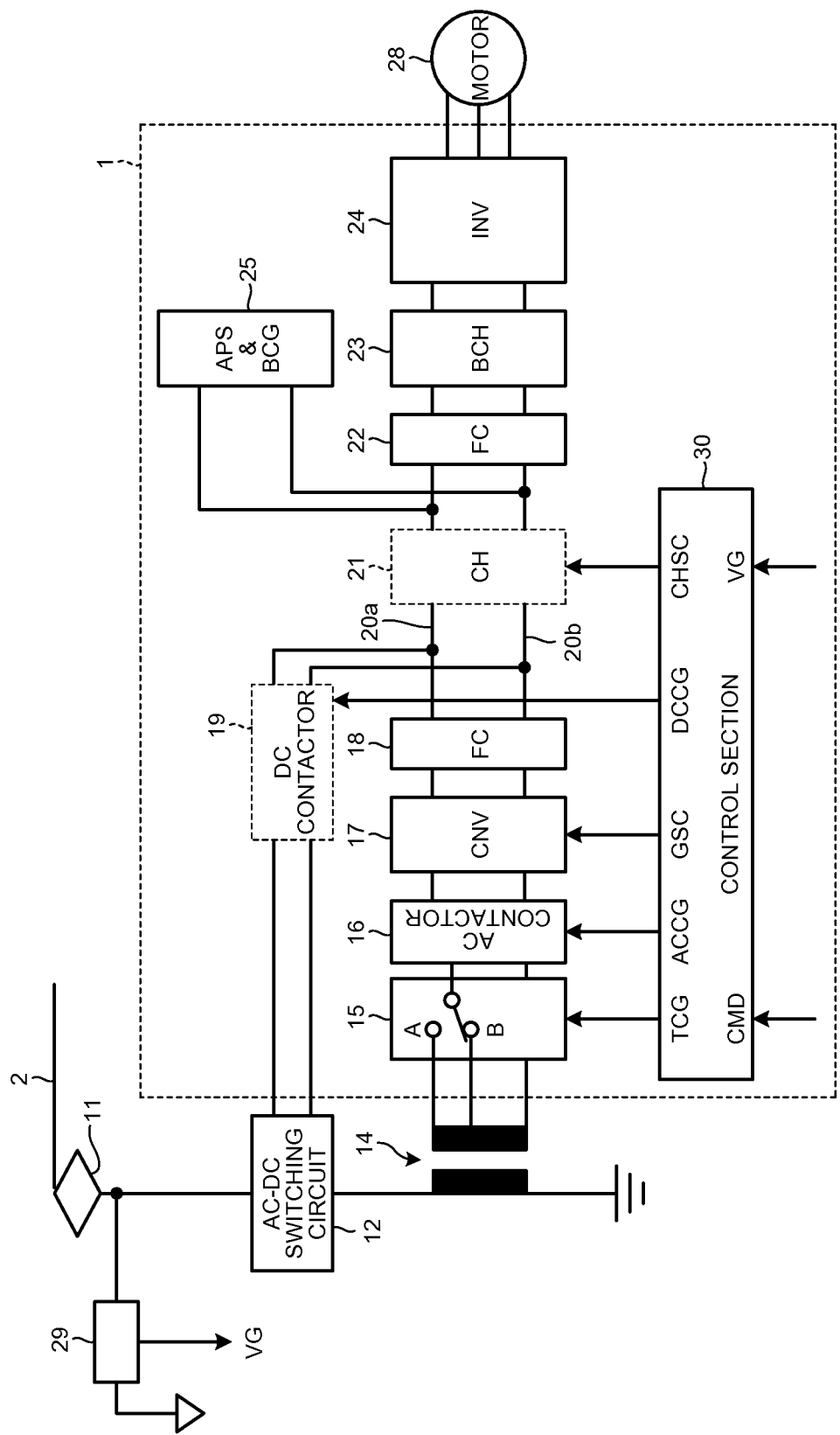
FIG. 3 is a diagram for explaining an operation performed when a second power supply (AC25 kV-50 Hz) is used as the supply power source.

An operation performed when the second power supply is used as the supply power source is explained. FIG. 3 is a diagram for explaining an operation performed when the second power supply (AC25 kV-50 Hz) is used as the supply power source. Specifically, in the figure, parts that operate receiving the supply of the second power supply are shown on the configuration diagram of FIG. 1. In FIG. 3, parts indicated by solid lines are parts related to the operation. Parts indicated by broken lines are parts not caused to operate.

The second power supply is also an alternating-current power supply. Therefore, alternating-current power from the second power supply is supplied to the transformer 14. The tap positions of the tap changer 15 are switched to the B side. Because the tap positions of the tap changer 15 are switched to the B side, even when the second power supply having a higher output voltage than the first power supply is applied, an output voltage from the secondary winding wire of the transformer 14 can be equivalent to the output voltage output when the first power supply is applied. Consequently, an applied voltage to the CNV 17 is equivalent to the applied voltage in the case of the first power supply. The units can be used in common. Note that the subsequent operations are the same as the operations in the case of the first power supply. Detailed explanation of the operations is omitted.

Note that a difference between power supply frequencies of the first power supply and the second power supply appears, for example, in a difference in the structure of the transformer 14. However, the transformer 14 only has to be designed to be adapted to the first power supply having a low power supply frequency. The transformer 14 designed in this way can also be used for the second power supply.

Figure 4:
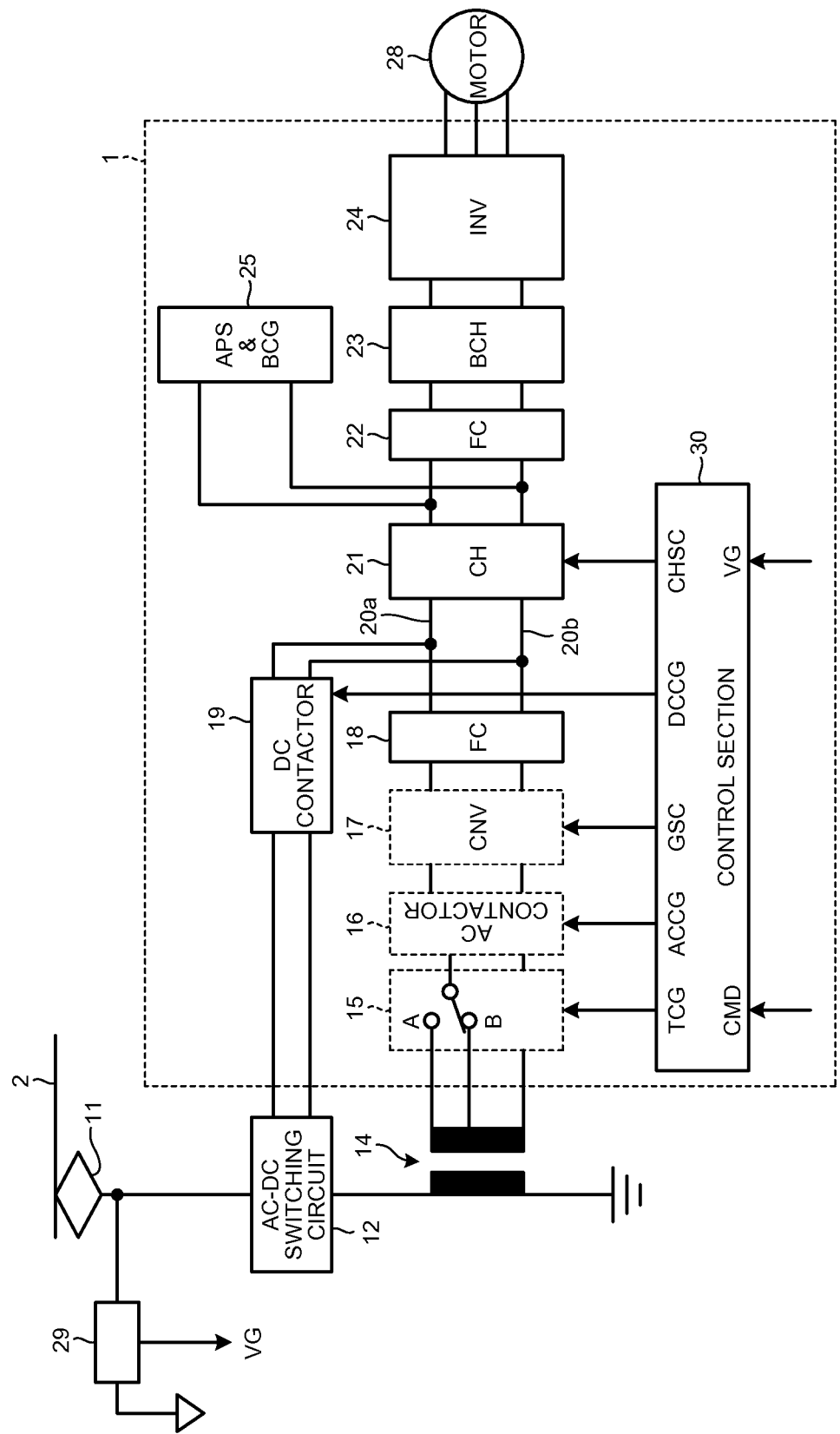
FIG. 4 is a diagram for explaining an operation performed when a third power supply (DC1.5 kV) is used as the supply power source.

An operation performed when the third power supply is used as the supply power source is explained. FIG. 4 is a diagram for explaining the operation performed when the third power supply (DC1.5 kV) is used as the supply power source. Specifically, in the figure, parts that operate receiving the supply of the third power supply are shown on the configuration diagram of FIG. 1. In FIG. 4, parts indicated by solid lines are parts related to the operation. Parts indicated by broken lines are parts not caused to operate or parts unrelated to the operation.

The third power supply is a direct-current power supply. Therefore, direct-current power from the third power supply is supplied to the CH 21 through the DC contactor 19 controlled to ON. In the tap changer 15, the AC contactor 16, and the CNV 17 indicated by the broken lines, the tap positions of the tap changer 15 are arbitrary. The AC contactor 16 is controlled to OFF. The CNV 17 does not operate. On the other hand, the CH 21 performs a chopper operation and steps up an input voltage. An output of the CH 21 is accumulated in the FC 22. An output voltage of the CH 21 is applied to the INV 24. The INV 24 supplies required electric power to the motor 28 using accumulated charges of the FC 22 and drives the motor 28. The APS & BCG 25 also supplies required electric power to the auxiliary machines using the accumulated charges of the FC 22 and causes the auxiliary machines to operate.

Figure 5:
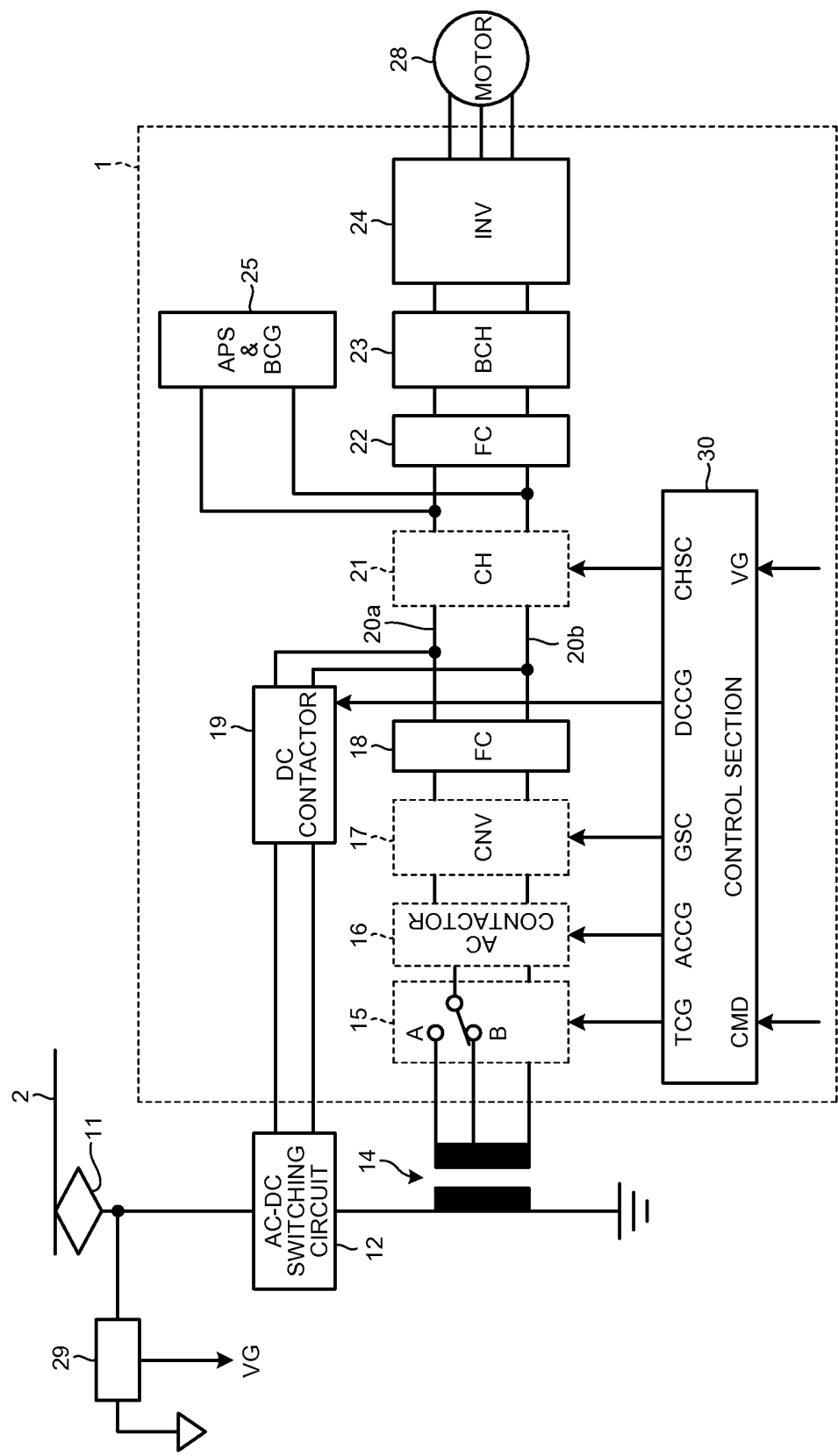
FIG. 5 is a diagram for explaining an operation performed when a fourth power supply (DC3.0 kV) is used as the supply power source.

Lastly, an operation performed when the fourth power supply is used as the supply power source is explained. FIG. 5 is a diagram for explaining the operation performed when the fourth power supply (DC3.0 kV) is used as the supply power source. Specifically, in the figure, parts that operate receiving the supply of the fourth power supply are shown on the configuration diagram of FIG. 1. In FIG. 5, parts indicated by solid lines are parts related to the operation. Parts indicated by broken lines are parts not caused to operate or parts unrelated to the operation.

The fourth power supply is also a direct-current power supply. Therefore, direct-current power from the fourth power supply is also supplied to the CH 21 through the DC contactor 19 controlled to ON. The states or the operations of the tap changer 15, the AC contactor 16, and the CNV 17 indicated by the broken lines are the same as the states or the operations in the case of the third power supply. On the other hand, in the case of the fourth power supply, except when it is necessary to cause the CH 21 to operate, the CH 21 is caused to perform a through-operation without being cause to operate. This is because the voltage of the fourth power supply is higher than the voltage of the third power supply and, therefore, it is unnecessary to cause the CH 21 to perform a boosting operation. According to such an operation of the CH 21, an applied voltage to the INV 24 is equivalent to the applied voltage in the case of the third power supply. The units can be used in common. Note that the subsequent operations are the same as the operations in the case of the third power supply. Detailed explanation of the operations is omitted.

The operations explained above are respective operations for the first to fourth power supplies. In a service route, even in an overhead wire in which two or more of the first to fourth power supplies are built, electric power supplied at a time is supplied from any one of the first to fourth power supplies. Therefore, the electric motor vehicle main circuit system can be adapted to all the power supplies.

Figure 6:
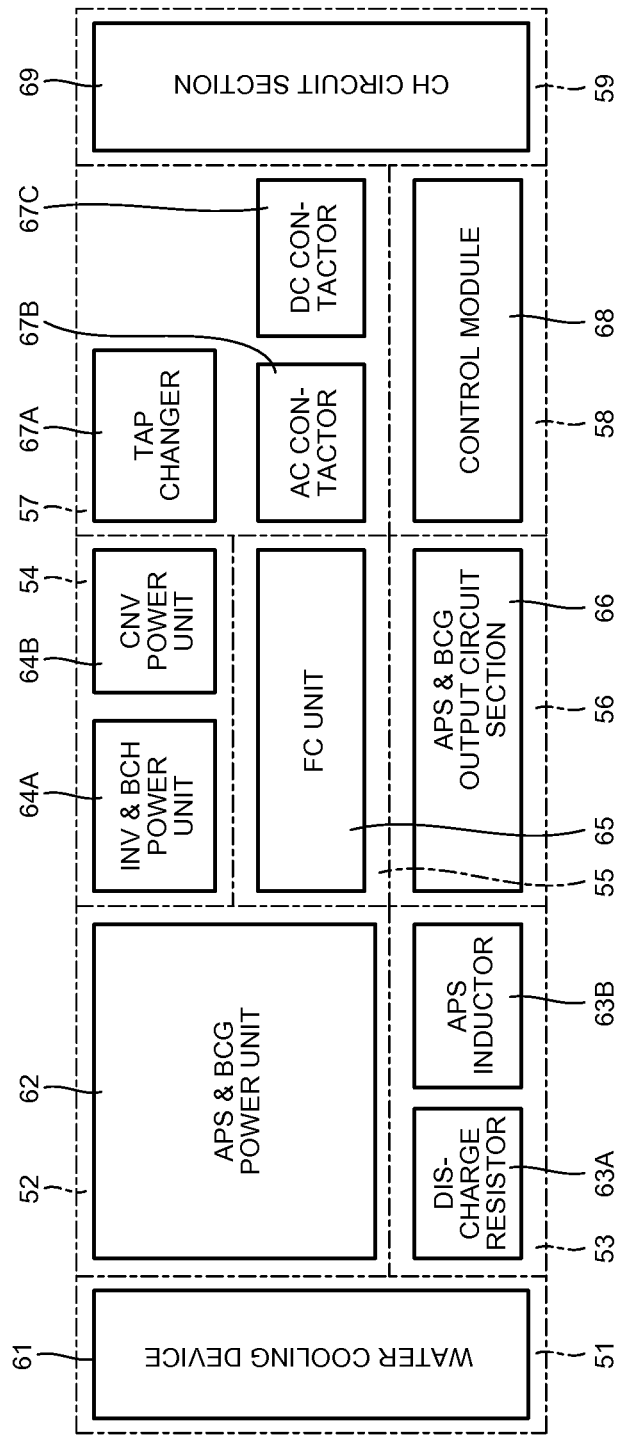
FIG. 6 is a diagram of an arrangement example in which the electric motor vehicle main circuit system configured as shown in FIG. 1 is viewed from above or below a vehicle when the electric motor vehicle main circuit system is mounted on an under-floor section or a roof of the vehicle.

FIG. 6 is a diagram of an arrangement example in which the electric motor vehicle main circuit system configured as shown in FIG. 1 is viewed from above or below a vehicle when the electric motor vehicle main circuit system is mounted on an under-floor section or a roof of the vehicle. In the example shown in FIG. 6, for example, the electric motor vehicle main circuit system shown in FIG. 1 is arranged to be divided into first to ninth parts. Specifically, a first part 51 corresponds to a water cooling device 61, a second part 52 corresponds to an APS & BCG power unit 62, a third part 53 corresponds to a discharge resistor 63A and an APS inductor 63B, a fourth part 54 corresponds to an INV & BCH power unit 64A and a CNV power unit 64B, a fifth part 55 corresponds to an FC unit 65, a sixth part 56 corresponds to an APS & BCG output circuit section 66, a seventh part 57 corresponds to a tap changer 67A, an AC contactor 67B, and a DC contactor 67C, an eighth part 58 corresponds to a control module 68, and a ninth part 59 corresponds to a CH circuit section 69.

What is characteristic in the configuration shown in FIG. 6 is that, in some component, a part of a circuit function is arranged to be separated and, in another component, a plurality of circuit functions are arranged to be integrated. For example, in FIG. 6, the APS & BCG 25 shown in FIG. 1 is separated into the APS & BCG power unit 62, the APS inductor 63B, and the APS & BCG output circuit section 66, which are three circuit sections, and respectively arranged as different parts. For example, in FIG. 6, the tap changer 15, the AC contactor 16, and the DC contactor 19 shown in FIG. 1 are arranged to be integrated in the seventh part 57 as the tap changer 67A, the AC contactor 67B, and the DC contactor 67C. The same applies to the CNV 17, the INV 24, and the BCH 23. The CNV 17, the INV 24, and the BCH 23 are arranged to be integrated in the fourth part 54 as the INV & BCH power unit 64A and the CNV power unit 64B.

In this way, a part of a circuit function is arranged to be separated or a plurality of circuit functions are arranged to be integrated. Consequently, it is possible to effectively utilize a limited space such as a vehicle under-floor section or a rooftop section.

FIG. 7 is a diagram of a list in a table format of operation modes corresponding to the first to fourth power supplies. In FIG. 7, the operation modes are divided into fifteen cases, i.e., a case 1 to a case 15, according to which of the first power supply (a power supply 1) to the fourth power supply (a power supply 4) the operation modes correspond. In the figure, black circles mean that the cases correspond to the power supplies indicated by the black circles. For example, the black circles mean that the case 1 corresponds to all the power supplies 1 to 4. The black circles mean that the case 3 corresponds to the power supplies 1 and 2, which are two alternating-current power supply, and the power supply 4, which is one of direct-current power supplies (conversely, the case 3 does not correspond to the power supply 3). The other cases can be explained the same.

In the right half of the table, states of the AC contactor and the DC contactor, the tap positions of the tap changer, and presence or absence of a CNV operation command CGSC and a CH operation command are shown. As explained with reference to the drawings of FIG. 2 to FIG. 5, the AC contactor is controlled to ON when the AC contactor operates with the power supplies 1 and 2, which are alternating-current power supplies. The AC contactor is controlled to OFF when the AC contactor operates with the power supplies 3 and 4, which are direct-current power supplies. Therefore, the AC contactor is controlled to ON in the cases not including a direct-current power supply such as the cases 6, 12, and 13. The AC contactor is controlled to OFF in cases not including an alternating-current power supply such as the cases 11, 14, and 15. The AC contactor is controlled to be switched to any one of ON and OFF in other cases.

The DC contactor is in a relation opposite to the relation of the AC contactor. The DC contactor is controlled to OFF in cases not including a direct-current power supply such as the cases 6, 12, and 13. The DC contactor is controlled to ON in cases not including an alternating-current power supply such as the cases 11, 14, and 15. The DC contactor is controlled to be switched to any one of ON and OFF in other cases.

The tap positions of the tap changer, the CNV operation command CGSC, the CH operation command CHSC are explained below in the same manner.

As explained with reference to the drawings of FIG. 2 to FIG. 5, the tap positions of the tap changer have a meaning when a power supply is the alternating-current power supplies (the power supplies 1 and 2). Therefore, in the cases not including an alternating-current power supply such as the cases 11, 14, and 15, the tap positions can be any positions. In cases including any one of the power supplies 1 and 2, which are the alternating-current power supplies, the tap positions are fixed. For example, in cases including only the power supply 1 as the alternating-current power supply such as the cases 4, 7, 8, and 12, the tap positions are fixed to A. In cases including only the power supply 2 as the alternating-current power supply such as the cases 5, 9, 10, and 13, the tap positions are fixed to B. In the other cases, the tap positions are controlled to be switched to any one of A and B.

The CNV operation command CGSC is output as appropriate (ON) when the power supply is the alternating-current power supplies (the power supplies 1 and 2). The CNV operation command CGSC is always controlled to OFF when the power supply is the direct-current power supplies (the power supplies 3 and 4). That is, the CNV operation command CGSC is output in the cases 6, 12, and 13, always controlled to OFF in the cases 11, 14, and 15, and switched to be always controlled to OFF or output as appropriate in the other cases.

The CH operation command CHSC is output as appropriate (ON) in the case of the power supply 3 and is always controlled to OFF in the case of the power supplies other than the power supply 3. That is, the CH operation command CHSC is output as appropriate without being always controlled to OFF only in the case 14, always controlled to OFF in the cases 3, 6, 8, 10, 12, 13, and 15, and switched to be always controlled to be OFF or output as appropriate in the other cases.

Note that the cases shown in FIG. 7 are summarized as follows from the viewpoint of the types of the power supplies.
(1) Case 1: Adapted to two alternating-current power supplies, two direct-current power supplies
(2) Cases 2 and 3: Adapted to two alternating-current power supplies, one direct-current power supply
(3) Cases 4 and 5: Adapted to one alternating-current power supply, two direct-current power supplies
(4) Case 6: Adapted to two alternating-current power supplies
(5) Cases 7 to 10: Adapted to one alternating-current power supply, one direct-current power supply
(6) Case 11: Adapted to two direct-current power supplies
(7) Cases 12 and 13: Adapted to one alternating-current power supply
(8) Cases 14 and 15: Adapted to one direct-current power supply A relation between the types of the power supplies and requests (functions) to the electric motor vehicle is explained.

For example, when there is a request to operate an electric motor vehicle having one specification among a route "a" in which the power supply 1 is used, a route "b" in which the power supply 2 is used, a route "c" in which the power supply 3 is used, and a route "d" in which the power supply 4 is used, the electric motor vehicle main circuit system shown in FIG. 1 satisfies the request.

An electric motor vehicle designed to operate with four types of power supplies like the electric motor vehicle main circuit system shown in FIG. 1 can meet various requests. For example, it is assumed that there is a request to apply the electric motor vehicle main circuit system to an electric motor vehicle that travels among the route "a" in which the power supply 1 is used, the route "b" in which the power supply 2 is used, and the route "d" in which the power supply 4 is used. In this case, the electric motor vehicle main circuit system shown in FIG. 1 can be directly used. However, the CH 21 can be removed from the configuration shown in FIG. 1. In this case, even if the CH 21 is removed, a direct-current bus between the FC 18 and the FC 22 only has to be electrically connected. A structural design change is little.

Note that the electric motor vehicle main circuit system that operates receiving the supplied power from the power supply 1, the power supply 2, and the power supply 4 can be built as a basic specification. The cases shown in FIG. 7 can be grasped as a system developed from the basis specification. This case corresponds to the case 3 shown in FIG. 7. Therefore, as expansion from the case 3 to the case 1, the system only has to be developed according to an idea for adding the CH 21 between the FC 18 and the FC 22 and adding a function for controlling the CH 21 to the control section 30.

Figure 8:
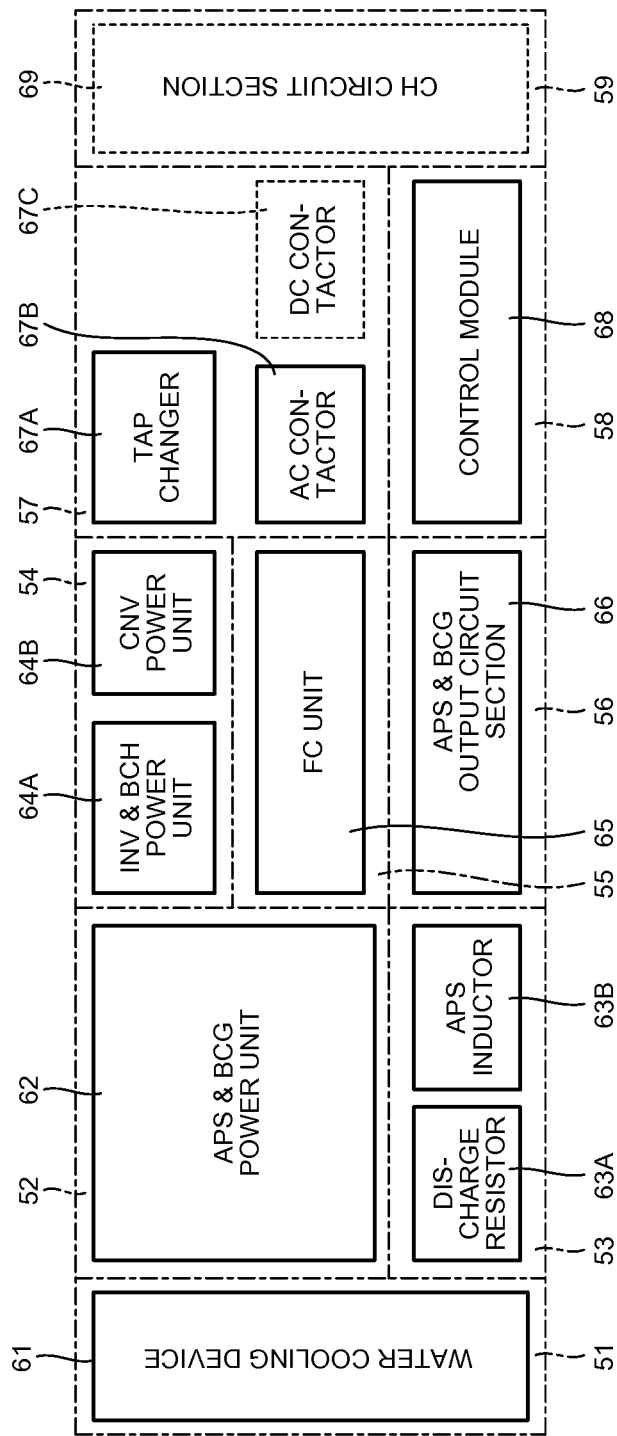
FIG. 8 is a diagram of an arrangement example of the electric motor vehicle main circuit system in which a CH circuit section is removed.

For example, it is also assumed that there is a request to apply the electric motor vehicle main circuit system to an electric motor vehicle that travels between the route "a" in which the power supply 1 is used and the route "b" in which the power supply 2 is used. In this case, contrary to the above idea, the AC-DC switching circuit 12, the DC contactor 19, and the CH 21 can be removed from the configuration shown in FIG. 1. In this case, the arrangement example of the electric motor vehicle main circuit system shown in FIG. 6 can be changed as shown in FIG. 8. In FIG. 8, as indicated by broken line sections, the DC contactor 67C and the CH circuit section 69 can be removed.

Note that, even when these components are removed, a structural design change can be little. The removal of the AC-DC switching circuit 12, the DC contactor 19, and the CH 21 is a reduction in the number of units. Therefore, there is no concern that the reliability of the system is deteriorated.

Figure 9:
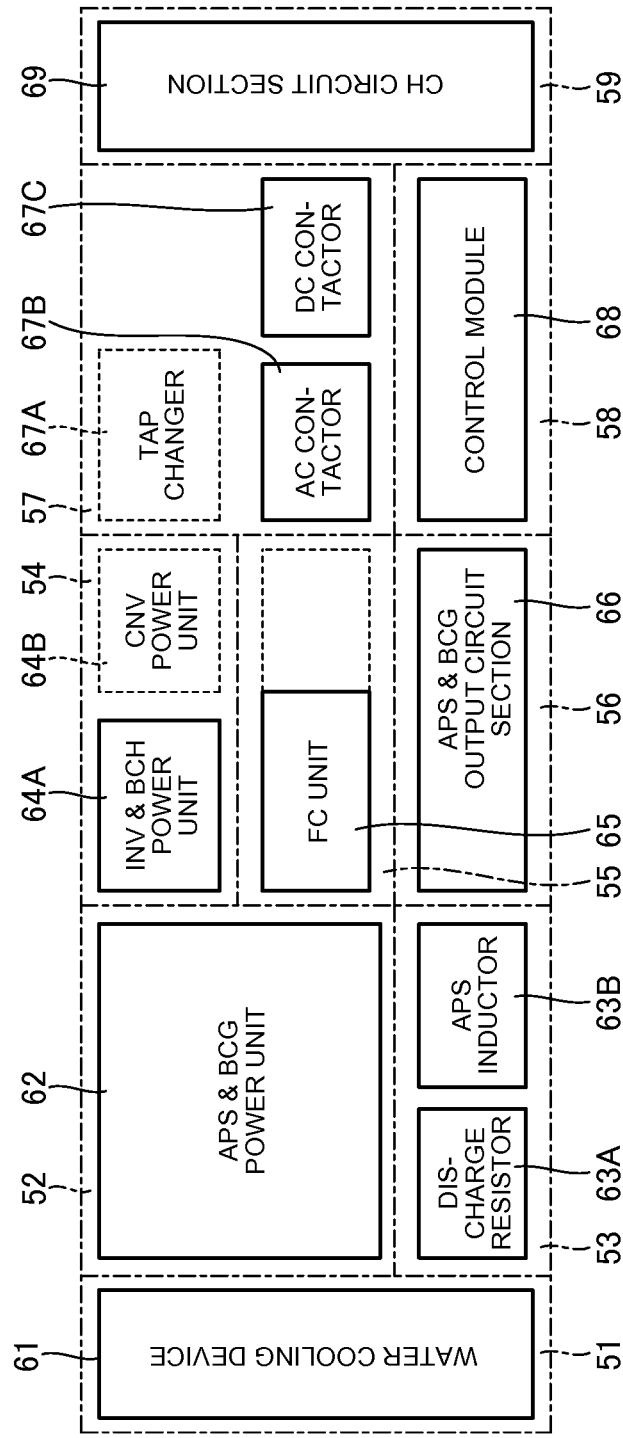
FIG. 9 is a diagram of an arrangement example of the electric motor vehicle main circuit system in which a CNV power unit and a tap changer are removed and an FC unit is reduced in size.

Further, for example, when there is a request to apply the electric motor vehicle main circuit system to an electric motor vehicle that travels between the route "c" in which the power supply 3 is used and the route "d" in which the power supply 4 is used, the AC-DC switching circuit 12, the tap changer 15, the AC contactor 16, the CNV 17, and the FC 18 can be removed from the configuration shown in FIG. 1. In this case, the arrangement example of the electric motor vehicle main circuit system shown in FIG. 6 can be changed as shown in FIG. 9. In FIG. 9, as indicated by broken line sections, the CNV power unit 64B and the tap changer 67A can be removed and the FC unit 65 can be reduced in size.

Note that, in the first embodiment, the electric motor vehicle main circuit system adaptable to the two types of alternating-current power supplies, that is, the first and second power supplies (the power supplies 1 and 2) and the two kinds of direct-current power supplies, that is, the third and fourth power supplies (the power supplies 3 and 4) is explained. However, it goes without saying that it is also possible to adapt the electric motor vehicle main circuit system to a more variety of alternating-current power supplies and direct-current power supplies by applying the technical idea of the first embodiment.

As explained above, the electric motor vehicle main circuit system according to the first embodiment can provide a system configuration adaptable to various combinations of the power supplies (the case 1 to the case 15). Therefore, there is an effect that it is possible to attain common use of components concerning all the cases, workability of management and maintenance of spare parts is improved, and reliability is improved. The combination of the power supplies does not need to be designed every time the power supplies are combined. Therefore, there is an effect that a product manufacturing period is reduced and the electric motor vehicle main circuit system can be easily adapted to a change to other power supplies.

Second Embodiment

Figure 10:
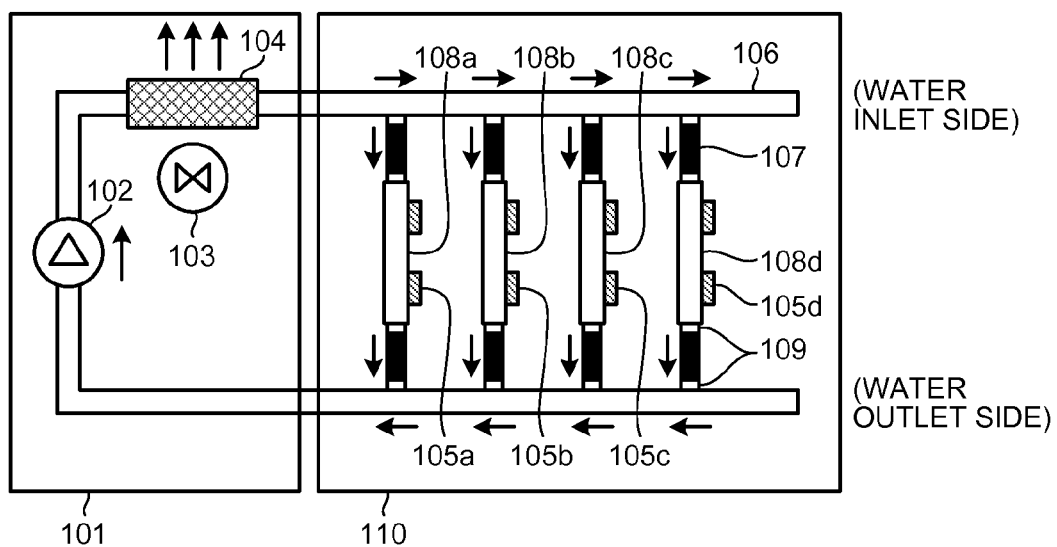
FIG. 10 is a schematic diagram of a configuration example of a water cooling system according to a second embodiment.

In a second embodiment, a water cooling system suitably used in the electric motor vehicle main circuit system according to the first embodiment is explained. FIG. 10 is a schematic diagram of a configuration example of the water cooling system according to the second embodiment. The configuration of the water cooling system suitably used in the electric motor vehicle main circuit system shown in FIG. 1 is shown. In FIG. 10, a water cooling system 100A includes a water cooling device 101 including a pump 102, a blower 103, and a heat exchanger 104, a main water pipe 106 drawn through a housing 110, which houses the electric motor vehicle main circuit system, from the water cooling device 101 and returning to the water cooling device 101, water cooling plates 108 (108a to 108d) provided on the housing 110 side and mounted with semiconductor elements 105 (105a to 105d), which are bodies to be cooled, and flexible tubes 107 including, at their ends, connectors 109 for connecting the water cooling plates 108 and the main water pipe 106.

In the water cooling system 100A, generated heat of the semiconductor elements 105 received by the water cooling plates 108 is circulated through the main water pipe 106 by the pump 102 and radiated to the outside by the heat exchanger 104 to cool the semiconductor elements 105. The example shown in the figure is explained. The water cooling plate 108a cools the semiconductor element 105a mounted on the APS & BCG power unit 62. The water cooling plate 108b cools the semiconductor element 105b mounted on the INV & BCH power unit 64A. The water cooling plate 108c cools the semiconductor element 105c mounted on the CNV power unit 64B. The water cooling plate 108d cools the semiconductor element 105d mounted on the CH circuit section 69.

In the configuration shown in FIG. 10, the main water pipe 106 needs to be a water pipe relatively thick and firm because the main water pipe 106 distributes cooling water to the water cooling plates 108. Therefore, the main water pipe 106 occupies a large space in the housing 110. A degree of freedom of arrangement of the main water pipe 106 is not high. However, for example, when the main water pipe 106 is applied to an apparatus, the specifications of which are clear, like the electric motor vehicle main circuit system shown in FIG. 1, the main water pipe 106 is not a significant problem.

Figure 11:
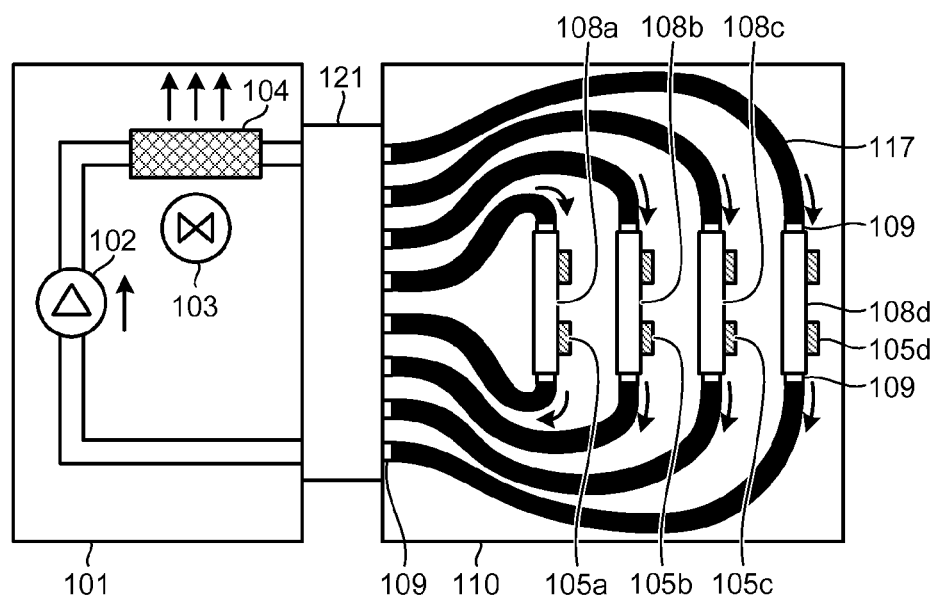
FIG. 11 is a schematic diagram of a configuration example different from FIG. 10 of the water cooling system according to the second embodiment.

On the other hand, FIG. 11 is a schematic diagram of a configuration example different from FIG. 10 of the water cooling system according to the second embodiment. In a water cooling system 100B shown in FIG. 11, the main water pipe 106 provided in the configuration shown in FIG. 10 is removed. Instead, a distribution block 121 is arranged between the water cooling device 101 and the housing 110. Note that a configuration example of the distribution block 121 is shown in FIG. 12 to FIG. 14.

Figure 12:
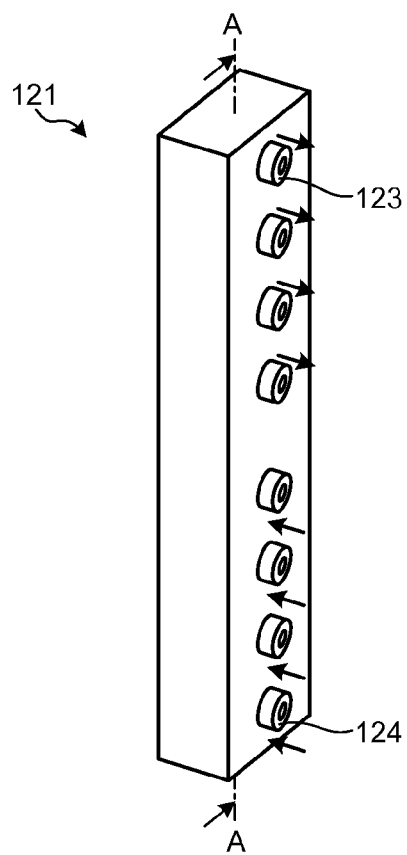
FIG. 12 is a perspective view of a distribution block according to the second embodiment viewed from an electric motor vehicle main circuit system side.
Figure 13:
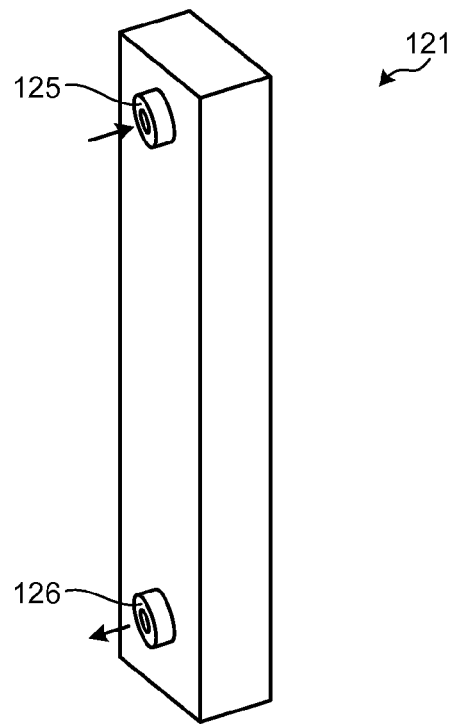
FIG. 13 is a perspective view of the distribution block according to the second embodiment viewed from a water cooling device side.
Figure 14:
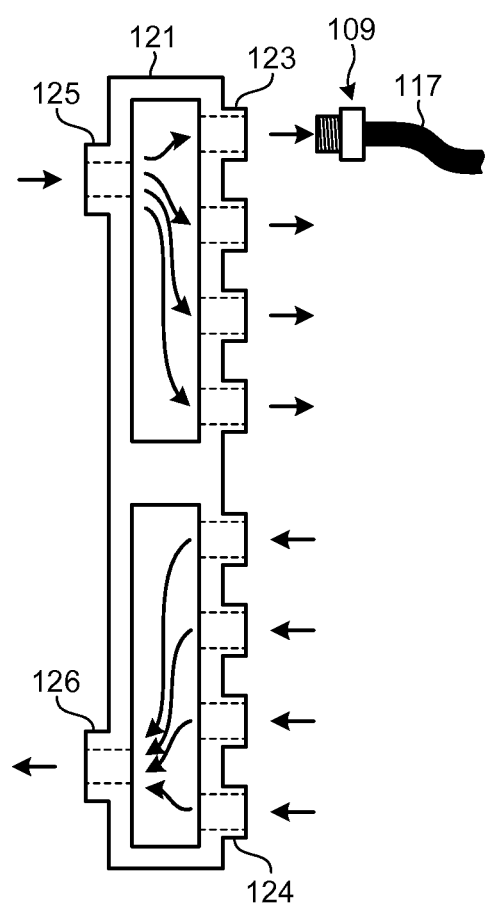
FIG. 14 is an arrow sectional view taken along line A-A in FIG. 12.

On one surface side of the distribution block 121, four water outlet holes 123 for supplying the cooling water to the water cooling plates 108 and four water inlet holes 124 for returning the cooling water, which receives heat of the water cooling plates 108, to the water cooling device 101 side are provided (see FIGS. 12 and 14). On the other surface side in the distribution block 121, a water inlet hole 125 for leading the cooling water to the distribution block 121 and a water outlet hole 126 for leading the cooling water, which is distributed from the distribution block 121, to the water cooling device 101 are provided (see FIGS. 12 and 13).

In the water outlet holes 123 and the water inlet holes 124, flexible tubes 117 longer than the flexible tubes shown in FIG. 10 are fit using the connectors 109. The flexible tubes 117 can be bent and arranged as shown in FIG. 11. Therefore, arrangement with a high degree of freedom and high flexibility is possible.

When the CH 21 is unnecessary, the CH circuit section 69 of the ninth part is unnecessary. The water cooling plate 108d and the flexible tube 117 that connects the water cooling plate 108d and the distribution block 121 are removed from the distribution block 121 of the water cooling system 100B (the water outlet hole 123 and the water inlet hole 124 corresponding to the flexible tube 117 are closed). Consequently, a space in the housing 110 is expanded and the maintainability is improved.

The water cooling system 100B shown in FIG. 11 is effective when a part of the request to the system is changed as explained in the first embodiment. As explained in the first embodiment, for example, when the electric motor vehicle is configured that is designed to operate with the first to fourth power supplies, that is, four types of alternating-current and direct-current power supplies and operates only with the two types of direct-current power supplies by the third and the fourth power supplies, it is possible to remove the tap changer 15, the AC contactor 16, the CNV 17, and the FC 18. Therefore, it is possible to arrange the water cooling device 101 in an empty space.

In the water cooling system 100A shown in FIG. 10, the main water pipe 106 is used. Therefore, it is difficult to move the water cooling device 101 without performing a substantial design change. On the other hand, in the water cooling system 100B shown in FIG. 11, the distribution block 121 and the flexible tubes 117 are used. Therefore, the water cooling system 100B can be flexibly adapted to the specification change. It is possible to effectively utilize a limited space in a vehicle control device set in an under-floor section or on a roof of the vehicle. Because the flexible tubes 117 more inexpensive than the main water pipe 106 is used, it is also possible to contribute to a cost reduction.

Figure 15:
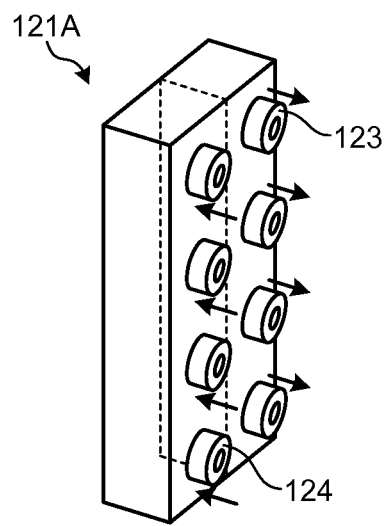
FIG. 15 is a perspective view of a distribution block having structure different from FIG. 12 viewed from the electric motor vehicle main circuit system side.
Figure 16:
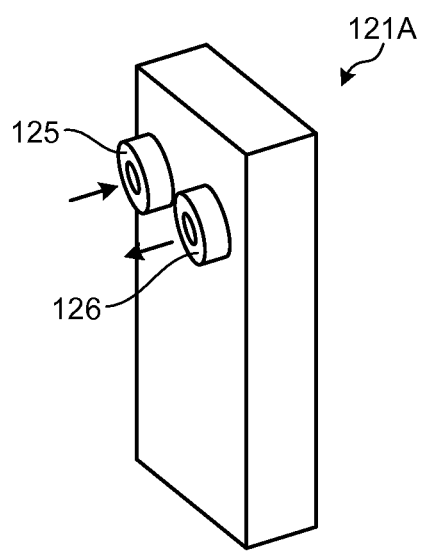
FIG. 16 is a perspective view of the distribution block having the structure different from FIG. 12 viewed from the water cooling device side.

Note that, in the distribution block 121 shown in FIG. 11, a configuration is shown in which the four water outlet holes 123 and the four water inlet holes 124 are linearly disposed in one longitudinal row. However, as in a distribution block 121A shown in FIGS. 15 and 16, the four water outlet holes 123 and the four water inlet holes 124 can be disposed in two longitudinal rows. Note that the numbers of the water outlet holes 123 and the water inlet holes 124 shown in FIGS. 12, 14, and 15 are examples. It goes without saying that the numbers are arbitrary.

The configurations explained above in the first and second embodiments are examples of the content of the present invention. It goes without saying that the configurations can be combined with other publicly-known technologies or can be configured to be changed to, for example, omit a part of the configurations without departing from the spirit of the present invention.

INDUSTRIAL APPLICABILITY

As explained above, the present invention is useful as an electric motor vehicle main circuit adaptable to a plurality of kinds of AC-DC multiple power supplies.

REFERENCE SIGNS LIST

1 Electric motor vehicle main circuit system
2 Overhead wire
11 Current collector
12 AC-DC switching circuit
14 Transformer
15, 67A Tap changers
16, 67B AC contactors
17 CNV (converter)
18 First FC (first filter capacitor)
19, 67C DC contactors
20a Positive side direct-current bus
20b Negative side direct-current bus
21 CH (boosting chopper)
22 Second FC (second filter capacitor)
23 BCH (brake chopper)
24 INV (inverter)
25 APS & BCG (auxiliary power supply device & battery charger)
28 Motor
29 Voltage detector
30 Control section
51 to 59 First to ninth parts
61, 101 Water cooling devices
62 APS & BCG power unit
63A Discharge resistor
63B APS inductor
64A INV & BCH power unit
64B CNV power unit
65 FC unit
66 APS & BCG output circuit section
68 Control module
69 CH circuit section
100A, 100B Water cooling systems
102 Pump
103 Blower
104 Heat exchanger
105 (105a to 105d) Semiconductor elements
106 Main water pipe
107, 117 Flexible tubes
108 (108a to 108d) Water cooling plates
109 Connectors
110 Housing
121 121A Distribution block
123, 126 Water outlet holes
124, 125 Water inlet holes

The invention claimed is:

1. An electric motor vehicle main circuit system configured to be capable of being housed in a vehicle control device that forms a part of an electric motor vehicle driving system, an AC-DC switching circuit that switches a supply destination of electric power according to a type of supplied power from an overhead wire and a transformer that includes two tap positions on a secondary winding wire side, steps down an input alternating-current voltage, and outputs a desired alternating-current voltage from the two tap positions being provided in the electric motor vehicle driving system, and alternating-current by a first alternating-current power supply, alternating-current power by a second alternating-current power supply having an higher output voltage than the first alternating-current power supply, direct-current power by a first direct-current power supply, and direct-current power by a second direct-current power supply having a higher output voltage than the first direct-current power supply being assumed as the type of the supplied power, the electric motor vehicle main circuit system comprising:
a tap changer that switches the tap positions of the transformer;
a converter that converts an alternating-current voltage output by the tap changer into a desired direct-current voltage;
an alternating-current contactor that opens and closes a power supply path between the tap changer and the converter;
a first filter capacitor that accumulates direct-current power output by the converter or direct-current power supplied from the overhead wire;
a chopper circuit that steps up a direct-current voltage output by the first filter capacitor to a desired direct-current voltage;
a second filter capacitor that accumulates direct-current power output by the chopper circuit;
an inverter that converts a direct-current voltage output by the second filter capacitor into a desired alternating-current voltage;
a direct-current contactor that opens and closes supply of direct-current power from the AC-DC switching circuit; and
a control section that controls the tap changer, the alternating-current contactor, the direct-current contactor, the converter, and the chopper circuit on the basis of information concerning a voltage of the overhead wire and command information from an outside,
the tap changer, the converter, the alternating-current contactor, the first filter capacitor, the chopper circuit, the second filter capacitor, the inverter, the direct-current contactor, and the control section being configured to be capable of being housed in the vehicle control device, wherein
when the first direct-current power supply is not used among the first and second alternating-current power supplies and the first and second direct-current power supplies, the electric motor vehicle main circuit system is configured by removing the chopper circuit.

2. The electric motor vehicle main circuit system according to claim 1, wherein, when the second direct-current power supply is not used either, the electric motor vehicle main circuit system is configured by removing the AC-DC switching circuit and the direct-current contactor.

3. The electric motor vehicle main circuit system according to claim 2, wherein, when the second alternating-current power supply is not used either, the electric motor vehicle main circuit system is configured by fixing the tap positions of the tap changer in predetermined tap positions or removing the tap changer.

4. The electric motor vehicle main circuit system according to claim 2, wherein, when the first alternating-current power supply is not used either, the electric motor vehicle main circuit system is configured by fixing the tap positions of the tap changer in predetermined tap positions or removing the tap changer.

5. The electric motor vehicle main circuit system according to claim 1, wherein, when the second alternating-current power supply is not used either, the electric motor vehicle main circuit system is configured by fixing the tap positions of the tap changer in predetermined tap positions or removing the tap changer.

6. The electric motor vehicle main circuit system according to claim 5, wherein, when the second direct-current power supply is not used either, the electric motor vehicle main circuit system is configured by removing the AC-DC switching circuit and the direct-current contactor.

7. The electric motor vehicle main circuit system according to claim 5, wherein, when the first alternating-current power supply is not used either, the electric motor vehicle main circuit system is configured by removing the AC-DC switching circuit and the alternating-current contactor.

8. The electric motor vehicle main circuit system according to claim 1, wherein, when the first alternating-current power supply is not used either, the electric motor vehicle main circuit system is configured by fixing the tap positions of the tap changer in predetermined tap positions or removing the tap changer.

9. The electric motor vehicle main circuit system according to claim 8, wherein, when the second alternating-current power supply is not used either, the electric motor vehicle main circuit system is configured by removing the AC-DC switching circuit and the alternating-current contactor.

10. The electric motor vehicle main circuit system according to claim 1, wherein
the electric motor vehicle main circuit system is configured as a water cooling system that circulates cooling water from a water cooling device to cool a body to be cooled,
the water cooling device is configured to be capable of being housed in the vehicle control device,
a distribution block for leading the cooling water from the water cooling device to a water cooling plate mounted with the body to be cooled and returning the cooling water after the cooling to the water cooling device is provided between the water cooling device and a housing mounted with the electric motor vehicle main circuit system, and
the distribution block and the water cooling plate is connected by a flexible tube.

* * * * *